US011467000B2

(12) United States Patent
Grigera et al.

(10) Patent No.: US 11,467,000 B2
(45) Date of Patent: Oct. 11, 2022

(54) DEFAULT MAP ZOOM LEVEL BY TRAVEL TIME

(71) Applicant: GOOGLE LLC, Mountain View, CA (US)

(72) Inventors: Alejo Grigera, Mountain View, CA (US); Ryan Galleher, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/606,612

(22) PCT Filed: Dec. 26, 2018

(86) PCT No.: PCT/US2018/067492
§ 371 (c)(1),
(2) Date: Oct. 18, 2019

(87) PCT Pub. No.: WO2020/139319
PCT Pub. Date: Jul. 2, 2020

(65) Prior Publication Data
US 2021/0364309 A1    Nov. 25, 2021

(51) Int. Cl.
*G01C 21/36* (2006.01)
*G06N 20/00* (2019.01)
*G01C 21/34* (2006.01)

(52) U.S. Cl.
CPC ....... *G01C 21/367* (2013.01); *G01C 21/3423* (2013.01); *G01C 21/3476* (2013.01); *G01C 21/3676* (2013.01); *G06N 20/00* (2019.01)

(58) Field of Classification Search
CPC ........ G06F 17/30241; G06F 17/30905; G06N 20/00; G01C 21/26; G01C 21/34;
(Continued)

(56) References Cited

U.S. PATENT DOCUMENTS 6,859,723 B2    2/2005  Yokota
7,555,388 B2    6/2009  Han
(Continued)

FOREIGN PATENT DOCUMENTS

CN          103500530 A      1/2014

OTHER PUBLICATIONS

International Search Report and Written Opinion for Application No. PCT/US2018/067492, dated Sep. 17, 2019.

*Primary Examiner* — Anthony R Jimenez
(74) *Attorney, Agent, or Firm* — Marshall, Gerstein & Borun LLP (57) ABSTRACT

Systems and methods are provided for generating a mapping application that displays an initial map with a zoom level that is based on a travel time associated with the location of the user. The mapping application receives a request to present a digital map from a client device. Based on the current geographic location of the client device, the mapping application estimates a distance in which a user of the client device can travel within a particular time period. The mapping application then selects a parameter for a viewport of the digital map based at least on the estimated distance. For example, the viewport parameter may be a zoom level. The mapping application then generates the digital map in accordance with the selected parameter, and displays the digital map via a user interface of the client device.

19 Claims, 6 Drawing Sheets

(58) Field of Classification Search
CPC ............. G01C 21/367; G01C 21/3423; G01C 21/3476; G01C 21/3626; G01C 21/3635; G01C 21/3644; G01C 21/3667; G01C 21/3673; G01C 21/3676; G01C 21/3679; G01C 21/3688; G01C 21/3694; G01C 21/3697; G08G 1/096888; G08G 1/096894; G08G 1/0969; G08G 1/0968; G08G 1/123
USPC ....................................................... 701/455
See application file for complete search history.

(56) References Cited

U.S. PATENT DOCUMENTS

| | | | |
|---|---|---|---|
| 8,223,172 | B1 | 7/2012 | Miller et al. |
| 8,825,403 | B1* | 9/2014 | Kadous ................ G01C 21/367 |
| | | | 701/533 |
| 8,954,860 | B1 | 2/2015 | Hands et al. |
| 2007/0118520 | A1 | 5/2007 | Bliss et al. |
| 2009/0055087 | A1 | 2/2009 | Beacher |
| 2013/0103313 | A1 | 4/2013 | Moore et al. |
| 2014/0306989 | A1 | 10/2014 | Doubleday et al. |
| 2014/0313525 | A1 | 10/2014 | Moore et al. |
| 2015/0369623 | A1 | 12/2015 | Blumenberg et al. |
| 2016/0062617 | A1 | 3/2016 | Isaacs |
| 2016/0203163 | A1 | 7/2016 | Cadell et al. |
| 2016/0298982 | A1 | 10/2016 | Bailiang |
| 2018/0143998 | A1 | 5/2018 | Prahladka et al. |

* cited by examiner

DEFAULT MAP ZOOM LEVEL BY TRAVEL TIME

FIELD OF THE DISCLOSURE

The present disclosure generally relates to mapping applications, and, more particularly, to providing a mapping application that displays an initial map with a zoom level that is based on a travel time associated with the location of the user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a user loads a mapping application, the application will display an initial map associated with the user's location before the user adds an origin or a destination. This initial map may include shops, restaurants, or other points of interest (POIs), so that a user can see what is nearby. In order to display the initial map, the application must determine an appropriate initial zoom level. For instance, the initial map may be zoomed out to show the entire state or country where the user is located, or may be zoomed in to show an area with the radius of a city block, or anything in between. Current mapping applications typically display an initial map that includes a radius of a few miles around the user's location. However, depending on where the user is located, an initial map that includes a one or two mile radius may not be useful.

For instance, an initial map that includes a one or two mile radius may show too little to be useful in a more spread-out or rural area. That is, one or two miles from a given location in a rural area may include few POIs, or no POIs. Moreover, a user located in a rural area may typically travel much further than one or two miles to reach a POI. On the other hand, an initial map that includes a one or two mile radius may show too much to be useful in a densely populated urban area. That is, one or two miles from a given location in a densely populated urban area may include an overwhelming number of POIs. Moreover, a user located in a densely populated urban area may typically travel much less than one or two miles to reach a POI.

SUMMARY

One example embodiment of the techniques of this disclosure is a non-transitory computer-readable medium storing thereon instructions that, when executed by one or more processors, cause the one or more processors to receive a request to present a digital map from a client device. The instructions further cause the one or more processors to estimate, based on a current geographic location of the client device, a distance in which a user of the client device can travel within a particular time period and select a parameter for a viewport of the digital map based at least on the estimated distance. Additionally, the instructions cause the one or more processors to generate the digital map in accordance with the selected parameter, and display the digital map via a user interface of the client device.

Another example embodiment is a method for generating digital maps. The method includes receiving, by one or more processors, a request to present a digital map from a client device. The method further includes estimating, by the one or more processors, based on a current geographic location of the client device, a distance in which a user of the client device can travel within a particular time period and selecting, by the one or more processors, a parameter for a viewport of the digital map based at least on the estimated distance. Additionally, the method includes generating, by the one or more processors, the digital map in accordance with the selected parameter and displaying, by the one or more processors, the digital map via a user interface of the client device.

Yet another example embodiment is a computing device for generating digital maps, where the computing device includes one or more processors and a non-transitory computer-readable memory coupled to the one or more processors and storing thereon instructions. The instructions, when executed by the one or more processors, cause the computing device to receive a request to present a digital map from a client device. The instructions further cause the computing device to estimate, based on a current geographic location of the client device, a distance in which a user of the client device can travel within a particular time period and select a parameter for a viewport of the digital map based at least on the estimated distance. Additionally, the instructions cause the computing device to generate the digital map in accordance with the selected parameter, and display the digital map via a user interface of the client device.

DETAILED DESCRIPTION

Overview

As discussed above, when a user loads a mapping application, the application will display an initial map associated with the user's location before the user adds an origin or a destination. This initial map may include shops, restaurants, or other points of interest (POIs), so that a user can see what is nearby. In order to display the initial map, the application must determine an appropriate initial zoom level. For instance, the initial map may be zoomed out to show the entire state or country where the user is located, or may be zoomed in to show an area with the radius of a city block, or anything in between. Current mapping applications typically display an initial map that includes a radius of a few miles around the user's location. However, depending on where the user is located, an initial map that includes a one or two mile radius may not be useful.

Figure 1:
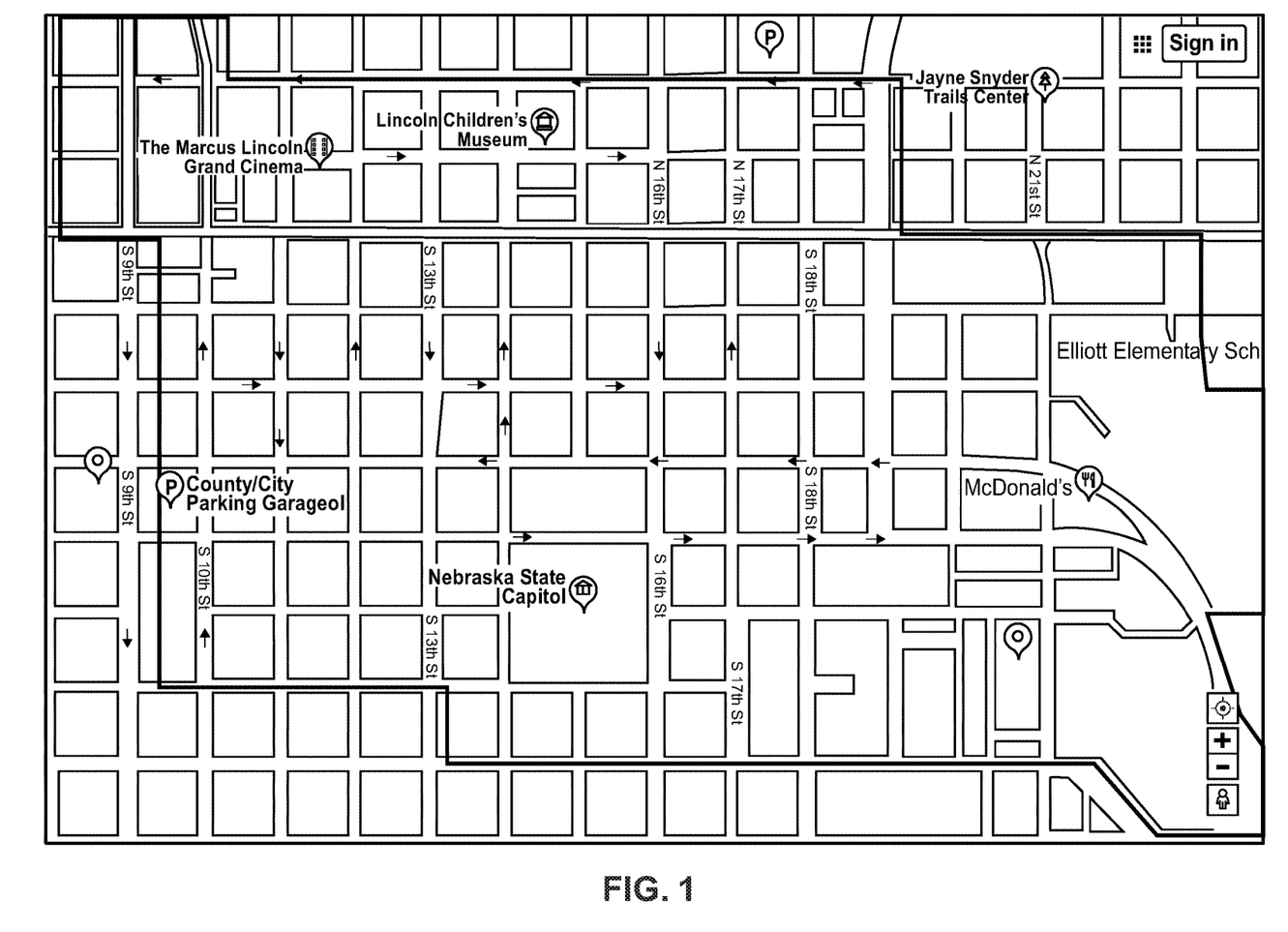
FIG. 1 is an example map display for a spread-out or rural area, with a one-mile zoom radius.

For instance, an initial map that includes a one or two mile radius may show too little to be useful in a more spread-out or rural area, or in a smaller city. That is, one or two miles from a given location in a rural area or smaller city may include only a few POIs, or may not include any POIs. For example, as shown in FIG. 1, a map zoomed to include a one mile radius in Lincoln, Nebr. includes only a small number of POIs. Moreover, a user located in a rural area may typically travel much further than one or two miles to reach a POI. For example, because there is generally less traffic in spread out or rural areas, a user in a spread out or rural area such as Lincoln, Nebr., may be comfortable driving ten miles to reach a POI because it will only take her about ten minutes.

Figure 2:
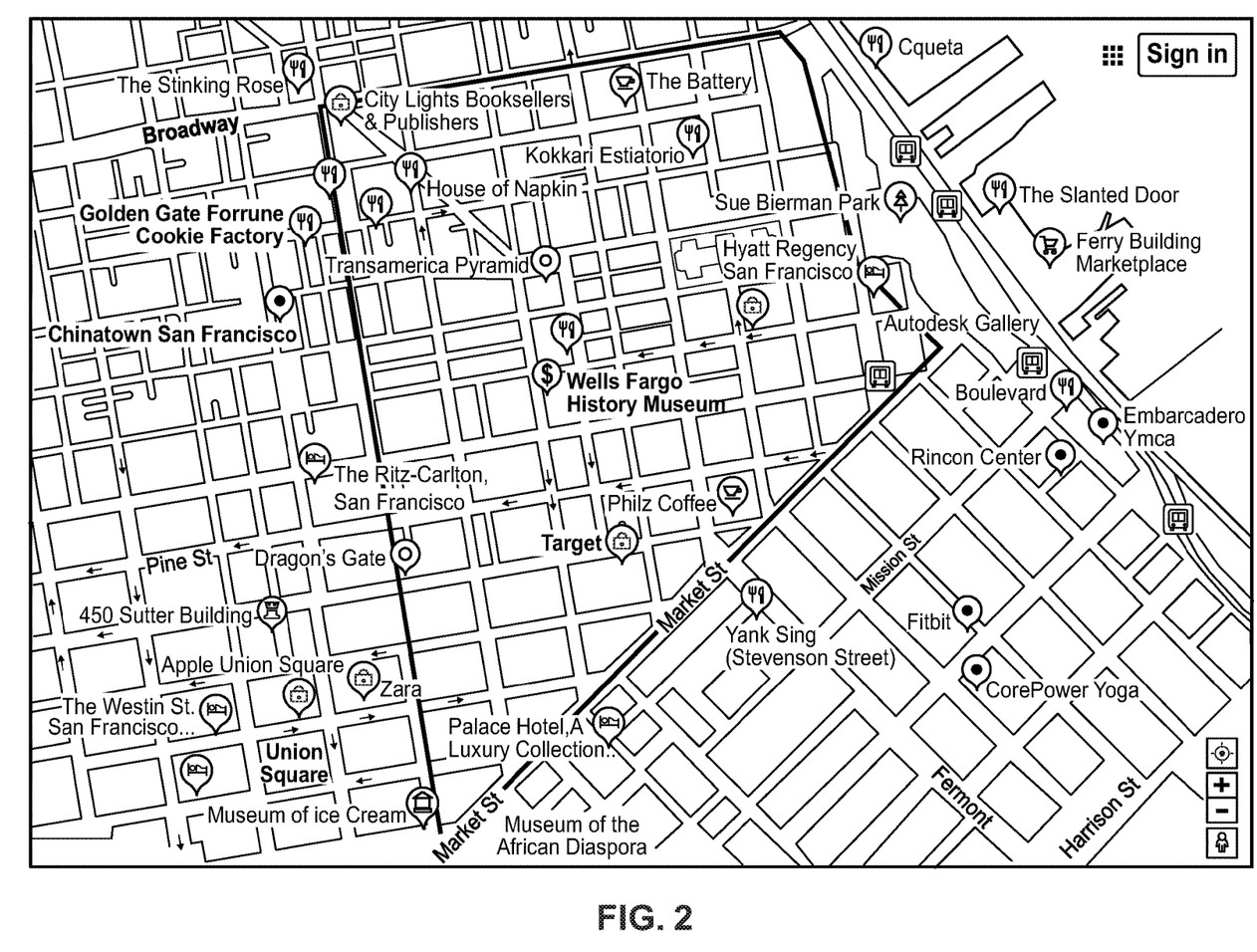
FIG. 2 is an example map display for a densely populated or urban area, with a one-mile zoom radius.

On the other hand, an initial map that includes a one or two mile radius may show too much to be useful in a densely populated urban area. That is, one or two miles from a given location in a densely populated urban area may include an overwhelming number of POIs. For example, as shown in FIG. 2, a map zoomed to include a one-mile radius in San Francisco includes a very large number of POIs. Moreover, a user located in a densely populated urban area may typically travel much less than one or two miles to reach a POI. For example, because there is generally more traffic in densely populated urban areas (and because individuals typically walk rather than drive in these areas), a user in a densely populated urban area such as San Francisco may only be comfortable walking up to 5 blocks to reach a POI, because that will take him about 15 minutes.

The methods and systems of this disclosure overcome these problems by providing a mapping application that displays an initial map with a zoom level that is based on a travel time associated with the location of the user. Beneficially, the application displays a map that is zoomed to include POIs that a user may reasonably visit based on the user's current geographic location. For instance, the application may select a travel time, such as 15 minutes, e.g., based on past travel times associated with the user, based on user inputs or selections, or by default. The application may estimate a distance that the user could reasonably travel in the selected travel time, e.g., based on current traffic information associated with the user's location and/or based on a mode of transport associated with the user or with the location of the user. For example, if traffic is moving at 30 miles per hour at the user's location, the application may estimate that the user will be able to drive about 7.5 miles in 15 minutes. As another example, if people in the user's area typically walk rather than drive, the application may estimate that the user will be able to walk about a mile in 15 minutes. Accordingly, when the user opens the application, the application may display an initial map with a zoom radius based on this estimated travel distance. For example, if the estimated travel distance for a 15-minute trip is 7.5 miles, a zoom radius of 7.5 miles around the user's location may be displayed in the initial map. Similarly, if the estimated travel distance for a 15-minute trip is 1 mile, a zoom radius of 1 mile around the user's location may be displayed in the initial map.

Some examples of the mapping application may provide an automatically adaptive initial or default view that may have a zoom level more likely to be suited to the user's needs relative to a mapping application having a fixed initial zoom level. Furthermore, this initial or default view may be provided without or with only limited additional interaction with the user. That is, the user may be less likely to have to manually adjust the zoom level of the mapping application from the initial or default zoom level, or any adjustment may be less than would be required for a fixed zoom. This may provide an improved user-machine interface for the mapping application. Although this may be generally beneficial, this may be particularly beneficial when the user is using the mapping application for driving, in which the user may have limited opportunity to make manual adjustments to the mapping application.

Example Hardware and Software Components

Figure 3:
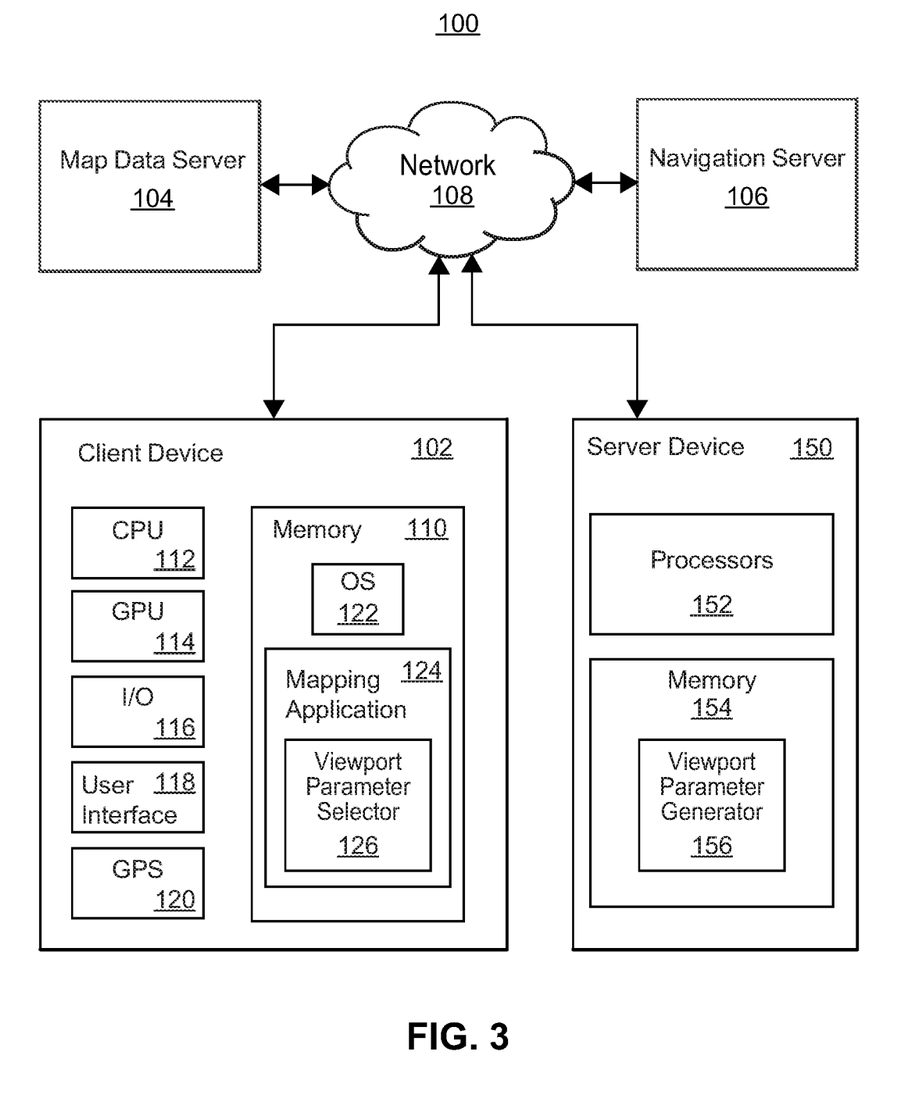
FIG. 3 is a block diagram of an example system in which techniques for displaying an initial map with a zoom level that is based on a travel time associated with the location of a user can be implemented.

Referring to FIG. 3, an example communication system 100 includes a client device 102 that may communicate with a map data server 104, a navigation server 106, and a server device 150, e.g., via a network 108. The map data server 104 may provide map data to the client device 102 for generating a map display, while the navigation server 106 may provide driving, walking, or public transit directions to the client device 102. In various implementations, the client device 102 may be a smartphone, a computer, a tablet, or any other suitable computing device. The client device 102 may include a memory 110, one or more processors (CPUs) 112, a graphics processing unit (GPU) 114, an I/O module 116, a user interface 118, and a Global Positioning Service (GPS) module 120.

The memory 110 may be a non-transitory memory and may include one or several suitable memory modules, such as random access memory (RAM), read-only memory (ROM), flash memory, other types of persistent memory, etc. The I/O module 116 may be a touch screen, for example. In various implementations, the client device 102 can include fewer components than illustrated in FIG. 3 or, conversely, additional components. In other embodiments, the client computing device 102 may be any suitable portable or non-portable computing device. For example, the client computing device 102 may be a laptop computer, a desktop computer, a wearable device such as a smart watch or smart glasses, etc.

The memory 110 stores an operating system (OS) 122, which may be any type of suitable mobile or general-purpose operating system. The OS 122 may include application programming interface (API) functions that allow applications to retrieve sensor readings. For example, a software application configured to execute on the client device 102 can include instructions that invoke an OS 122 API for retrieving a current geographic location of the client device 102 at that instant. The memory 110 also stores a mapping application 124, which is configured to generate interactive digital maps.

The mapping application 124 may include a viewport parameter selector 126, which may be configured to select a parameter for a viewport of a digital map based on an estimated distance in which a user of the client device 102 can travel within a particular time period. Generally speaking, the viewport of a digital map includes a geographic area surrounding an initial location, such as the current geographic location of the client device 102 or a default location. An example viewport parameter may be a zoom level of the digital map. In some examples, the viewport parameter selector 126 may be configured to select a zoom level such that the zoom radius around the initial location, as shown in the digital map, is equal to the estimated distance that the user of the client device 102 can travel within the particular time period.

In some examples, the particular time period may be a default time period, such as 15 minutes or 20 minutes. Additionally or alternatively, the viewport parameter selector 126 may be configured to analyze the user's past trips to identify an average travel time associated with the user, and may use the average travel time as the particular time period.

Furthermore, in some examples, the viewport parameter selector 126 may be configured to generate a machine learning model using user interactions associated with previously presented digital maps or previously selected POIs as training data, and may select the particular time period using the machine learning model.

The viewport parameter selector 126 may utilize driving, walking, or public transit directions from the navigation server 106 in conjunction with factors such as traffic conditions associated with the geographic location, weather conditions associated with the geographic location, speed limits associated with the geographic location, a mode of transport associated with the geographic location (or a mode of transport associated with the user of the client device 102), etc. to estimate the distance that the user of the client device 102 can travel during the particular time period. Moreover, the viewport parameter selector 126 may utilize driving, walking, or public transit directions from the navigation server 106 to estimate a plurality of distances in different directions from the initial location in which the user can travel within the particular time period and combine the plurality of distances to generate an estimated distance (e.g., by averaging the plurality of distances).

Accordingly, using the viewport parameter selected by the viewport parameter selector 126, the mapping application 124 may generate the digital map in accordance with the selected parameter and display the digital map via the user interface 118 of the client device 102. In particular, the mapping application 124 may generate the digital map in accordance with the selected parameter prior before receiving any user input indicating a destination location.

It is noted that although FIG. 3 illustrates the mapping application 124 as a standalone application, the functionality of the mapping application 124 also can be provided in the form of an online service accessible via a web browser executing on the client computing device 102, as a plug-in or extension for another software application executing on the client computing device 102, etc. The mapping application 124 generally can be provided in different versions for different respective operating systems. For example, the maker of the client device 102 can provide a Software Development Kit (SDK) including the mapping application 22 for the Android™ platform, another SDK for the iOS™ platform, etc.

In addition to the client device 102, the communication system 100 includes a server device 150 configured to provide a viewport parameter for generating a map display on the client device 102. The communication system 100 also can include a navigation data server 106 that provides driving, walking, biking, or public transit directions, for example and determines travel times from starting locations to destinations. Further, the communication system 100 can include a map data server 104 that provides map data to the server device 150 for generating a map display. The devices operating in the communication system 100 can be interconnected via a communication network 108.

In some implementations, the server device 150 includes one or more processors 152 and a memory 154. The memory 154 may be tangible, non-transitory memory and may include any types of suitable memory modules, including random access memory (RAM), read-only memory (ROM), flash memory, other types of persistent memory, etc. The memory 154 stores instructions executable on the processors 152 that make up a viewport parameter generator 156, which can determine an initial viewport parameter for the viewport of a map display in a mapping application. For example, the initial viewport parameter may be a zoom level. The viewport parameter generator 156 may receive a request for map data including an initial location from the client device 102, and more specifically from the viewport parameter selector 126. In some embodiments, the initial location is a current geographic location of the user of the client device 102. In other embodiments, the initial location is a default location such as San Francisco.

In any event, the viewport parameter generator 156 may then determine a viewport parameter, such as a zoom level for the map display. As described above, the viewport parameter generator 156 may determine the zoom level based on an estimated distance in which a user may travel from the initial location within a particular time period (e.g., 15 minutes). To estimate the distance in which a user may travel from the initial location within a particular time period, the viewport parameter generator 156 may request the navigation server 106 to provide navigation directions and corresponding travel times and travel distances from the initial location to POIs within a threshold distance of the initial location (e.g., 60 miles). Then the viewport parameter generator 156 may identify the POIs having travel times matching the particular time period. In some embodiments, the viewport parameter generator 156 may calculate an average of the travel distances for the identified POIs as the zoom radius. In other embodiments, the viewport parameter generator 156 may filter some of the identified POIs, such that the viewport parameter generator 156 identifies POIs in different directions from the initial location (e.g., one POI in each cardinal direction from the initial location) and then calculates an average of the travel distances for the identified POIs.

In some embodiments, the particular time period for estimating a distance in which a user may travel from the initial location is a predetermined time period (e.g., 10 minutes, 15 minutes, 20 minutes, etc.). In other embodiments, the viewport parameter generator 156 determines the particular time period using a machine learning model. More specifically, the user may select a user control in the mapping application 124 to share her location data and user interaction data. The viewport parameter generator 156 may then obtain user interactions associated with previously presented digital maps or previously selected POIs as training data for the machine learning model. For example, the viewport parameter generator 156 may obtain instances of previously presented digital maps in which the user adjusted the zoom level within a threshold time period of the digital map being presented, and instances of digital maps in which the user did not adjust the zoom level within the threshold time period. For each instance of a previously presented digital map, the viewport parameter generator 156 may obtain an indication of the initial zoom level and/or an indication of the adjusted zoom level. The viewport parameter generator 156 may also assign a corresponding time period to each zoom level as an estimate of the amount of time it takes to travel the zoom radius corresponding to the zoom level, such that as the zoom level increases the time period decreases. For example, for zoom level 6 the time period may be 15 minutes and for zoom level 8 the time period may be 10 minutes.

The machine learning model may then determine the time period based on the time periods associated with final zoom levels for the previously presented digital maps. The final zoom levels may be the adjusted zoom levels or the initial zoom level if the initial zoom level is not adjusted within the threshold time period of the digital map being presented. For example, the machine learning model may determine the time period as an average of the time periods associated with the final zoom levels, a weighted average of the time periods associated with the final zoom levels where the most recently presented digital maps are assigned higher weights, or based on any suitable combination of the time periods associated with the final zoom levels.

In some embodiments, the machine learning model may determine the time period based on the time periods associated with final zoom levels for the previously presented digital maps and the geographic areas for the previously presented digital maps. For example, the viewport parameter generator 156 may provide the initial location for the requested map data to the machine learning model, and the machine learning model may determine the time period based on the time periods associated with final zoom levels for previously presented digital maps that include the initial location or locations within a threshold distance of the initial location.

For example, the machine learning model may indicate a time period of 10 minutes for San Francisco and a time period of 15 minutes for Half Moon Bay, Calif., a small coastal town outside of San Francisco. When the machine learning model receives an initial location between San Francisco and Half Moon Bay, the machine learning model may determine which city is closer to the initial location and determine the time period as the time period associated with the closer city.

The machine learning model may be generated using any suitable machine learning techniques such as a regression analysis (e.g., a logistic regression, linear regression, or polynomial regression), k-nearest neighbors, decisions trees, random forests, boosting, neural networks, support vector machines, deep learning, reinforcement learning, Bayesian networks, etc. In the examples described above, the viewport parameter generator 156 generates a machine learning model based on user interaction data from the user requesting map data. In other embodiments, the viewport parameter generator 156 may provide user interactions from several users as training data for the machine learning model.

Also in some embodiments, the viewport parameter generator 156 may provide a mode of transport to the navigation server 106 with the request for navigation directions and corresponding travel times and travel distances. Then the viewport parameter generator 156 may identify the POIs having travel times matching the particular time period for the particular mode of transport. In some embodiments, the particular mode of transport is driving. In other embodiments, the viewport parameter generator 156 determines the particular mode of transport based on the initial location. For example, the viewport parameter generator 156 may determine that the particular mode of transport is driving for rural areas and walking for urban areas. In another example, if the initial location is within close proximity to a bike path, the viewport parameter generator 156 may determine that the particular mode of transport is biking, and if the initial location is within close proximity to a train station, the viewport parameter generator 156 may determine that the particular mode of transport is public transportation.

In yet other embodiments, the viewport parameter generator 156 may determine the mode of transport based on a user profile of the user of the client device 102. More specifically, the user may select a user control in the mapping application 124 to share her location data and navigation history. The navigation history may include previous navigation requests from a starting location to a destination and a corresponding mode of transport for each navigation request. Then the viewport parameter generator 156 may determine the mode of transport as the most frequent mode of transport from the user's navigation history in her user profile. Additionally or alternatively, the viewport parameter generator 156 may determine the mode of transport as the most frequent mode of transport for navigation requests having a starting location within a threshold distance (e.g., one mile) of the initial location in the user's navigation history.

In any event, the viewport parameter generator 156 may then identify a zoom level corresponding to the zoom radius and may request map data from the map data server 104 for a geographic area including the initial location at the identified zoom level. Then the viewport parameter generator 156 may provide the map data at the identified zoom level to the viewport parameter selector 126, for display on the client device 102. In other embodiments, the viewport parameter generator 156 provides map data for a geographic area that includes the initial location to the client device 102 along with an indication of the identified zoom level. The viewport parameter selector 126 then generates the map display including the initial location at the identified zoom level. In some embodiments, the map display is presented to the user when the client device 102 launches the mapping application 124.

The viewport parameter generator 156 and the viewport parameter selector 126 can operate as components of a viewport parameter generation system. Alternatively, the viewport parameter generation system can include only server-side components and simply provide the viewport parameter selector 126 with instructions to present the digital map with the determined viewport parameter. In other words, viewport parameter generation techniques in these embodiments can be implemented transparently to the viewport parameter selector 126. As another alternative, the entire functionality of the viewport parameter generator 156 can be implemented in the viewport parameter selector 126.

Example Map Displays

Figure 4:
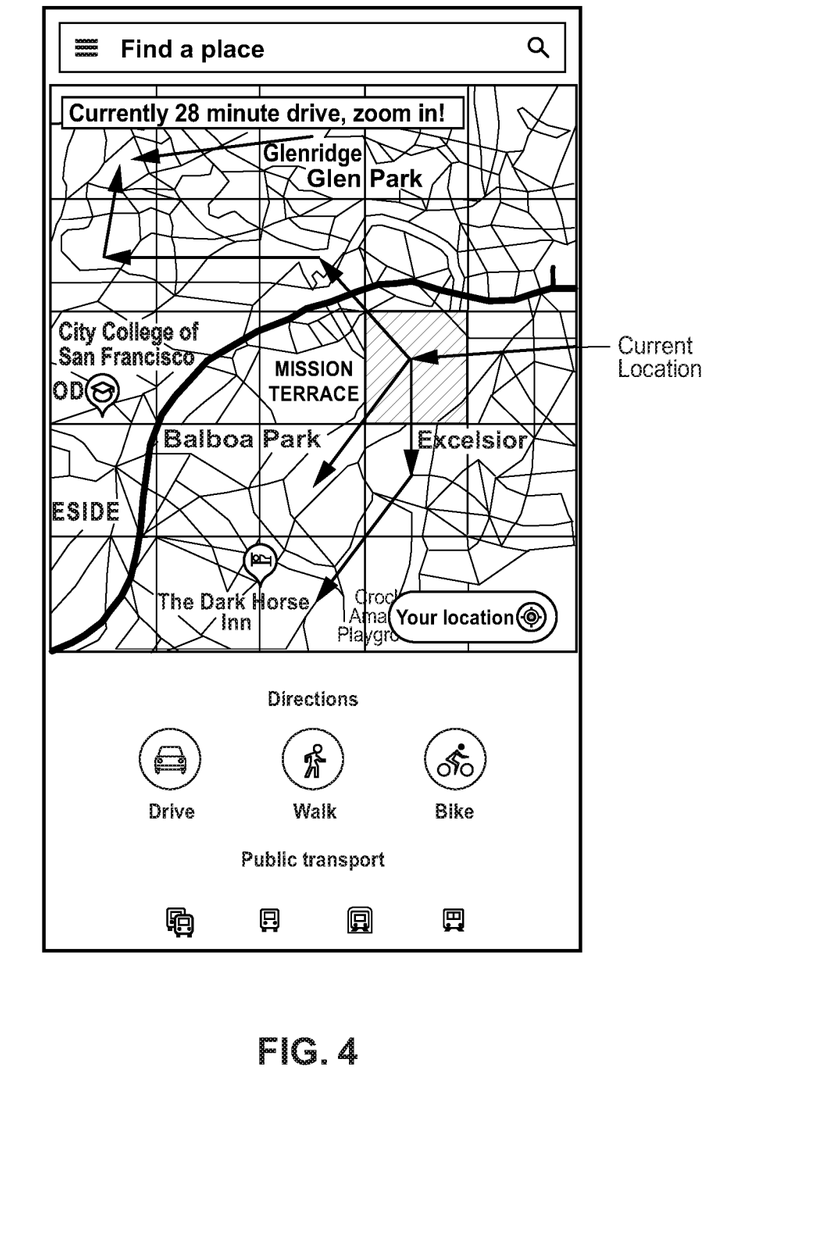
FIG. 4 is an example map display with a zoom level that is to be increased based on a travel time associated with the location of a user.

FIG. 4 is an example map display of a geographic area including the user's current geographic location having a zoom level (e.g., zoom level 6) that is to be increased by the viewport parameter generator 156 and/or the viewport parameter selector 126 based on a travel time associated with the location of a user. For example, in response to receiving a request for map data for a geographic area including the user's current geographic location, the viewport parameter generator 156 may retrieve map data from the map data server 104 at zoom level 6 for the geographic area including the user's current geographic location. Then the viewport parameter generator 156 may request navigation data from the navigation server 106 which includes travel times from the user's current geographic location to POIs or other locations at or near the boundaries of the geographic area including the user's current geographic location at zoom level 6. As shown in FIG. 4, the geographic area surrounding the current geographic location of the client device 102 includes locations that are up to a 28 minute drive from the location of the client device 102. If the user of the client device displaying the map of FIG. 4 is located in a densely populated urban area, this map display is zoomed out too far to show the user useful, walkable POIs.

The viewport parameter generator 156 then compares the identified travel time (e.g., 28 minutes) to a threshold time period (e.g., 15 minutes), and if the identified travel time exceeds the threshold time period by more a threshold variance (e.g., one minute), the viewport parameter generator 156 may increase the zoom level and repeat the process. If the identified travel time is less than the threshold time period by more the threshold variance (e.g., one minute), the viewport parameter generator 156 may decrease the zoom level and repeat the process until the identified travel time matches the threshold time period or is within the threshold variance (e.g., one minute) of the threshold time period. In other embodiments, this is not an iterative process and the viewport parameter generator 156 identifies, via the navigation server 106, locations having travel times from the user's current geographic location that are within the threshold variance of the threshold time period. The viewport parameter generator 156 then determines a zoom radius based on the distances from the user's current geographic location to the identified locations, and identifies a zoom level corresponding to the zoom radius.

Figure 5:
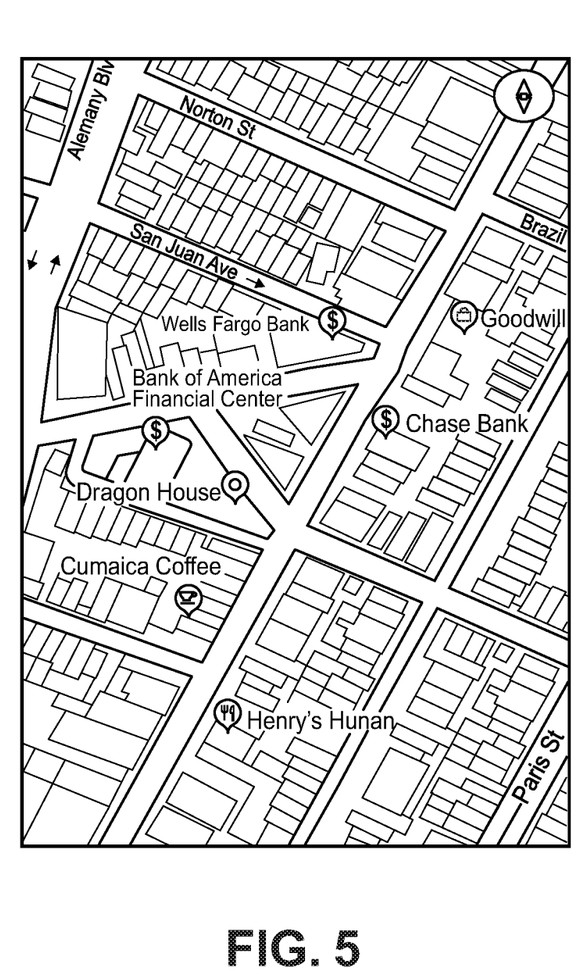
FIG. 5 is an example map display with a zoom level that has been increased based on a travel time associated with the location of a user.

FIG. 5 is an example map display with a zoom level (e.g., zoom level 8) that has been increased based on a travel time associated with the location of a user, in accordance with the techniques of this disclosure. The map display of FIG. 5 depicts the same location as shown in FIG. 4, but has been automatically zoomed in (e.g., to zoom level 8) so that the geographic area shown in the map display reflects the distance that a user of the client device can travel within a particular time period (e.g., 10 minutes walking). More specifically, in FIG. 5, travel times from the user's current geographic location to POIs or other locations at or near the boundaries of the map display are within the threshold variance (e.g., one minute) of the threshold time period (e.g., 10 minutes walking).

Example Methods

Figure 6:
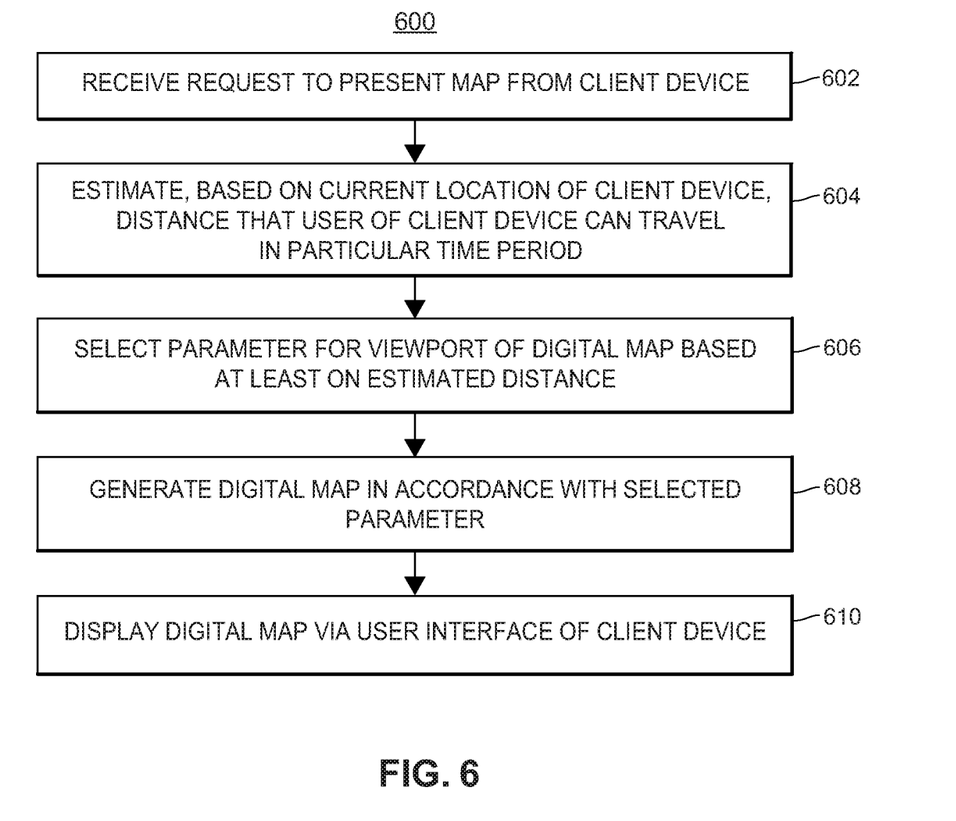
FIG. 6 is a flow diagram of an example method for displaying an initial map with a zoom level that is based on a travel time associated with the location of a user.

FIG. 6 illustrates a flow diagram of an example method 600 for generating digital maps. The method 600 can be implemented in a set of instructions stored on a computer-readable memory and executable at one or more processors of the client device 102. For example, the method 600 can be implemented by the mapping application 124 and/or the viewport parameter selector 126. In other embodiments, the method 600 can be implemented by the server device 150, and more specifically, the viewport parameter generator 156. In yet other embodiments, the method 600 is implemented by any suitable combination of the client device 102, the server device 150, the viewport parameter selector 126, and/or the viewport parameter generator 156. According to the method 600, a zoom level is determined for a client device 102. However, a similar method can be used to determine other map viewport parameters.

At block 602, a request to present a digital map having an initial location may be received from the client device 102. For example, a user of the client device may open a mapping application 124 on the client device 102, triggering a request to present a digital map.

At block 604, a distance that a user of a client device 102 can travel in a particular time period may be estimated based on the initial location, such as the current geographic location of the client device 102 or a default location. Generally speaking, the distance that the user of the client device 102 can travel during the particular time period may reflect a distance that the user of the client device 102 is likely to travel on a typical trip. In some examples, the particular time period may be a default time period for typical user travel time, such as 10 minutes, 15 minutes, 20 minutes, etc. Additionally, in some examples, the particular time period may be selected based on previous trips associated with the user of the client device 102. For instance, the particular time period may be an average (e.g., mean, median, mode, etc.) travel time based on previous trips associated with the user of the client device 102.

Furthermore, in some examples, the particular time period may be learned by generating a machine learning model using user interactions associated with previously presented digital maps or previously selected POIs as training data. For instance, if a user typically zooms in when an initial digital map is presented by the mapping application, the particular time period may be decreased. Conversely, if a user typically zooms out when an initial digital map is present by the mapping application, the particular time period may be increased. As another example, if a user typically selects POIs that are further away or with longer estimated transit times from her current geographic location, the particular time period may be increased. Conversely, if a user typically selects POIs that are closer by or with shorter estimated travel times from her current geographic location, the particular time period may be decreased.

More specifically, user interactions may be obtained that are associated with previously presented digital maps or previously selected points of interest POIs as training data for the machine learning model. For example, instances of previously presented digital maps may be obtained in which the user adjusted the zoom level within a threshold time period of the digital map being presented, and instances of digital maps may be obtained in which the user did not adjust the zoom level within the threshold time period. For each instance of a previously presented digital map, an indication of the initial zoom level and/or an indication of the adjusted zoom level may be obtained. A corresponding time period may also be assigned to each zoom level as an estimate of the amount of time it takes to travel the zoom radius corresponding to the zoom level, such that as the zoom level increases the time period decreases. For example, for zoom level 6 the time period may be 15 minutes and for zoom level 8 the time period may be 10 minutes.

The machine learning model may then determine the time period based on the time periods associated with final zoom levels for the previously presented digital maps. The final zoom levels may be the adjusted zoom levels or the initial zoom level if the initial zoom level is not adjusted within the threshold time period of the digital map being presented. For example, the machine learning model may determine the time period as an average of the time periods associated with the final zoom levels, a weighted average of the time periods associated with the final zoom levels where the most recently presented digital maps are assigned higher weights, or based on any suitable combination of the time periods associated with the final zoom levels.

In some embodiments, the machine learning model may determine the time period based on the time periods associated with final zoom levels for the previously presented digital maps and the geographic areas for the previously presented digital maps. For example, the initial location for the requested map data may be provided to the machine learning model, and the machine learning model may determine the time period based on the time periods associated with final zoom levels for previously presented digital maps that include the initial location or locations within a threshold distance of the initial location.

In any event, the distance that the user of the client device 102 can travel in the particular time period may be based on factors such as traffic conditions associated with the geographic location, weather conditions associated with the geographic location, speed limits associated with the geographic location, a mode of transport associated with the geographic location, a mode of transport associated with the user of the client device 102, a time of day, and/or some combination of these factors. In some embodiments, the distance that the user of the client device 102 can travel in the particular time period is determined by retrieving navigation data from the navigation server 106 which includes estimated travel times from the initial location to various locations and corresponding travel distances to the various locations taking into account traffic conditions, weather conditions, speed limits, etc.

For example, increased traffic associated with the geographic location of the client device 102 may mean that the user of the client device 102 can travel a shorter distance in the particular time period, while decreased traffic associated with the geographic location of the client device 102 may mean that the user of the client device 102 can travel a longer distance in the particular time period. Additionally, severe weather conditions associated with the geographic location of the client device 102 may mean that the user of the client device 102 can travel a shorter distance in the particular time period, while normal weather conditions associated with the geographic location of the client device 102 may mean that the user of the client device 102 can travel a longer distance in the particular time period.

Furthermore, higher speed limits associated with geographic location of the client device 102 may mean that the user of the client device 102 can travel a greater distance in the particular time period, while lower speed limits associated with the geographic location of the client device 102 may mean that the user of the client device 102 can travel a shorter distance in the particular time period.

Additionally, the distance that the user of the client device 102 can travel in the particular time period may be based on a mode of transport associated with the geographic location of the client device 102 (or associated with the user of the client device 102). For instance, a user may typically use one mode of transport, such as walking, public transit, or a personal vehicle. Additionally, if the client device 102 is located in a city, walking may be a mode of transport associated with the geographic location of the client device 102. When the mode of transport associated with the geographic location of the client device 102 (or associated with the user of the client device 102) is walking, the user of the client device 102 may only be capable of traveling a short distance during the particular time period. Furthermore, if the client device 102 is located near a train stop or bus stop, the train or the bus may be a mode of transport associated with the geographic location of the client device 102. When the mode of transport associated with the geographic location of the client device 102 (or associated with the user of the client device 102) is public transit, such as a bus or train, the user of the client device 102 may be capable of traveling a longer distance during the particular time period. Moreover, if the client device 102 is located in a suburban or rural area, a personal vehicle may be a mode of transport associated with the geographic location of the client device 102. When the mode of transport associated with the geographic location of the client device 102 (or associated with the user of the client device 102) is a personal vehicle, the user of the client device 102 may be capable of traveling an even longer distance during the particular time period.

In some examples, estimating the distance in which a user of the client device 102 can travel within a particular time period may include estimating, based on the initial location, a plurality of distances in different directions from the initial location in which the user can travel within the particular time period, and combining the plurality of distances to generate an estimated distance. For example, a number of sample routes for traveling for the particular amount of time in various directions from the geographic location of the client device 102 may be retrieved from the navigation server 106, and the distances associated with each of the sample routes may be averaged to result in an estimated distance in which the user of the client device 102 can travel within the particular time period.

At block 606, a parameter for a viewport of a digital map may be selected based on the estimated distance. The viewport may include a geographic area surrounding the initial location. In some examples, the selected viewport parameter may be a zoom level. For instance, the zoom level may be selected so that a zoom radius around the initial location is equal to the estimated distance in which the user of the client device 102 can travel within the particular time period. Accordingly, the geographic area surrounding the initial location in the digital map may reflect POIs and streets within an area where the user of the client device 102 is likely to travel, without including POIs that are unnecessarily far away from the initial location.

At block 608, a digital map may be generated in accordance with the selected parameter, and at block 610, the digital map may be displayed via a user interface of the client device 102. In particular, the digital map may be displayed via the user interface of the client device 102 prior to the receipt, by the client device 102, of any user input indicating a destination location. Accordingly, a user of the client device 102 may view POIs and streets within the area where the user of the client device 102 is likely to travel in order to select a POI. For example, a user of the client device 102 may open an initial map that reflects a variety of restaurants within the area where the user of the client device 102 is likely to travel.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC))

to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for establishing communication sessions related to navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing thereon instructions that, when executed by one or more processors, cause the one or more processors to:
   receive a request to present a digital map from a client device;
   estimate, based on a current geographic location of the client device, a distance in which a user of the client device can travel within a particular time period;
   select a parameter for a viewport of the digital map based at least on the estimated distance;
   generate the digital map in accordance with the selected parameter; and
   display the digital map via a user interface of the client device, wherein the digital map is displayed via the user interface of the client device prior to the receipt, by the client device, of any user input indicating a destination location.

2. The computer-readable medium of claim 1, wherein the distance is estimated based on one or more of: traffic conditions associated with the geographic location, weather conditions associated with the geographic location, speed limits associated with the geographic location, a mode of transport associated with the geographic location, and/or a mode of transport associated with the user of the client device.

3. The computer-readable medium of claim 1, wherein the particular time period is selected based on previous trips associated with the user of the client device.

4. The computer-readable medium of claim 1, wherein the particular time period is learned by generating a machine learning model using user interactions associated with previously presented digital maps or previously selected points of interest (POIs) as training data.

5. The computer-readable medium of claim 1, wherein the viewport includes a geographic area surrounding the current geographic location of the client device.

6. The computer-readable medium of claim 1, wherein to estimate a distance in which a user of the client device can travel within a particular time period, the instructions cause the one or more processors to:
   estimate, based on the current geographic location of the client device, a plurality of distances in different directions from the current geographic location in which the user can travel within the particular time period; and
   combine the plurality of distances to generate an estimated distance.

7. The computer-readable medium of claim 1, wherein the distance in which the user of the client device can travel within the particular time period is based on the current geographic location of the client device and a particular mode of transport.

8. The computer-readable medium of claim 1, wherein the viewport parameter is a zoom level.

9. The computer-readable medium of claim 8, wherein the zoom level is selected such that a zoom radius around the current geographic location of the client device is equal to the estimated distance.

10. A method for generating digital maps, the method comprising:
    receiving, by one or more processors, a request to present a digital map, from a client device;
    estimating, by the one or more processors, based on a current geographic location of the client device, a distance in which a user of the client device can travel within a particular time period;
    selecting, by the one or more processors, a parameter for a viewport of the digital map based at least on the estimated distance;
    generating, by the one or more processors, the digital map in accordance with the selected parameter; and
    displaying, by the one or more processors, the digital map via a user interface of the client device, wherein the digital map is displayed via the user interface of the client device prior to the receipt, by the client device, of any user input indicating a destination location.

11. The method of claim 10, wherein estimating the distance based on the current geographic location of the client device includes:
    estimating, by the one or more processors, the distance based on one or more of: traffic conditions associated with the geographic location, weather conditions associated with the geographic location, speed limits associated with the geographic location, a mode of transport associated with the geographic location, and/or a mode of transport associated with the user of the client device.

12. The method of claim 10, further comprising:
    selecting, by the one or more processors, the particular time period based on previous trips associated with the user of the client device.

13. The method of claim 10, further comprising:
    learning, by the one or more processors, the particular time period by generating a machine learning model using user interactions associated with previously presented digital maps or previously selected points of interest (POIs) as training data.

14. The method of claim 10, wherein the viewport includes a geographic area surrounding the current geographic location of the client device.

15. The method of claim 10, wherein estimating a distance in which a user of the client device can travel within a particular time period includes:
   estimating, by the one or more processors, based on the current geographic location of the client device, a plurality of distances in different directions from the current geographic location in which the user can travel within the particular time period; and
   combining, by the one or more processors, the plurality of distances to generate an estimated distance.

16. The method of claim 10, wherein estimating the distance in which a user of the client device can travel within a particular time period is based on both the current geographical location of the client device and a particular mode of transport.

17. The method of claim 10, wherein the viewport parameter is a zoom level.

18. The method of claim 17, further comprising:
   selecting, by the one or more processors, the zoom level such that a zoom radius around the current geographic location of the client device is equal to the estimated distance.

19. A computer system comprising one or more processors configured to:
   receive a request to present a digital map from a client device;
   estimate, based on a current geographic location of the client device, a distance in which a user of the client device can travel within a particular time period;
   select a parameter for a viewport of the digital map based at least on the estimated distance;
   generate the digital map in accordance with the selected parameter; and
   display the digital map via a user interface of the client device, wherein the digital map is displayed via the user interface of the client device prior to the receipt, by the client device, of any user input indicating a destination location.

* * * * *